(12) United States Patent
Porzio et al.

(10) Patent No.: US 12,373,294 B2
(45) Date of Patent: *Jul. 29, 2025

(54) HARDWARE RESET MANAGEMENT FOR UNIVERSAL FLASH STORAGE

(71) Applicant: Micron Technology, Inc., Boise, ID (US)

(72) Inventors: Luca Porzio, Casalnuovo (IT); Ferdinando Pascale, Ottaviano (IT); Roberto Izzi, Caserta (IT); Marco Onorato, Villasanta (IT); Erminio Di Martino, Quarto (IT)

(73) Assignee: Micron Technology, Inc., Boise, ID (US)

(*) Notice: Subject to any disclaimer, the term of this patent is extended or adjusted under 35 U.S.C. 154(b) by 0 days.

This patent is subject to a terminal disclaimer.

(21) Appl. No.: 18/638,245

(22) Filed: Apr. 17, 2024

(65) Prior Publication Data

US 2024/0345925 A1 Oct. 17, 2024

Related U.S. Application Data

(63) Continuation of application No. 17/874,952, filed on Jul. 27, 2022, now Pat. No. 11,983,073.

(51) Int. Cl.
| | |
|---|---|
| *G06F 15/177* | (2006.01) |
| *G06F 1/24* | (2006.01) |
| *G06F 9/00* | (2018.01) |
| *G06F 9/4401* | (2018.01) |
| *G06F 11/14* | (2006.01) |

(52) U.S. Cl.
CPC ............ *G06F 11/1417* (2013.01); *G06F 1/24* (2013.01); *G06F 9/4405* (2013.01)

(58) Field of Classification Search
CPC ...... G06F 11/1417; G06F 1/24; G06F 9/4405; G06F 9/4401
See application file for complete search history.

(56) References Cited

U.S. PATENT DOCUMENTS

| | | | | |
|---|---|---|---|---|
| 6,202,119 B1 * | 3/2001 | Manning | ............... | G11C 7/1039 |
| | | | | 711/2 |
| 11,194,587 B2 | 12/2021 | Lee | | |
| 11,372,700 B1 * | 6/2022 | Kuramoto | ............. | G06F 11/106 |
| 2002/0179943 A1 * | 12/2002 | Shirai | ...................... | G11C 7/20 |
| | | | | 257/238 |

(Continued)

*Primary Examiner* — Xuxing Chen
(74) *Attorney, Agent, or Firm* — Holland & Hart LLP

(57) ABSTRACT

Methods, systems, and devices for hardware reset management for universal flash storage (UFS) are described. A UFS device may initiate a boot-up procedure that includes multiple phases. The UFS device may perform a first reset operation to reset one or more circuits based on receiving a first reset command during a first phase. The UFS device perform a second phase and may initiate a portion of a second reset operation to reset the one or more circuits during the second phase based on a likelihood that a second reset command is to be received. The UFS device may receive the second reset command during the second phase after initiating the portion of the second reset operation. The UFS device may initiate a second portion of the second reset operation based on receiving the second reset command and initiating the portion of the second reset operation.

20 Claims, 6 Drawing Sheets

(56) References Cited

U.S. PATENT DOCUMENTS

| | | |
|---|---|---|
| 2019/0188083 A1 | 6/2019 | Cho |
| 2021/0004241 A1 | 1/2021 | Banik et al. |
| 2022/0284105 A1 | 9/2022 | Krishnegowda et al. |
| 2023/0063280 A1* | 3/2023 | Kim .................. G06F 3/0659 |
| 2023/0069752 A1 | 3/2023 | Izzi et al. |
| 2023/0195474 A1 | 6/2023 | Basso et al. |
| 2023/0205547 A1* | 6/2023 | Nasim .................. G06F 9/546 |
| | | 713/2 |
| 2023/0315595 A1* | 10/2023 | Sayyed ............... G06F 11/2284 |
| 2023/0359466 A1* | 11/2023 | Sarkar .................. G06F 21/79 |

\* cited by examiner

HARDWARE RESET MANAGEMENT FOR UNIVERSAL FLASH STORAGE

CROSS REFERENCE

The present Application for Patent is a continuation of U.S. patent application Ser. No. 17/874,952 by Porzio et al., entitled "HARDWARE RESET MANAGEMENT FOR UNIVERSAL FLASH STORAGE," filed Jul. 27, 2022, assigned to the assignee hereof, and is expressly incorporated by reference in its entirety herein.

FIELD OF TECHNOLOGY

The following relates to one or more systems for memory, including hardware reset management for universal flash storage.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

A device (e.g., a universal flash storage (UFS) device) may include systems that employ memory devices, such as a NOT-AND (NAND) device, that aid in one or more services performed by the systems. However, in some examples, a delay between powering on the systems (e.g., due to the UFS device being started) and other systems of the device coming online (e.g., safety systems, which may include a back-up camera or parking camera for vehicle implementations) may occur due at least in part to latency from the NAND device during a boot-up procedure. Accordingly, reducing the duration of the boot-up procedure (e.g., by reducing latency associated with the NAND device) may reduce latency from powering the system to the other systems being fully operational.

Techniques are described herein that reduce the duration of the boot-up procedure. For instance, a boot-up procedure may be characterized by multiple phases (e.g., a preliminary boot loader (PBL) phase, an extended boot loader (XBL) phase, and a kernel boot loader phase), where each phase of the boot-up procedure may be preceded by a hardware reset of one or more components of the system. In some examples, one or more operations associated with a respective phase may be conducted before the UFS device may perform a requested reset command. As such, the UFS device may reduce a time between receiving the reset command and performing the reset operation by identifying a likelihood of at what time a reset command may be received. If the UFS device determines that the likelihood of receiving the reset command satisfies one or more conditions, the memory system of the UFS device may preemptively begin to conclude operations of a given phase and prepare to receive the reset command. Some examples of identifying the likelihood may include identifying a duration since receiving a last reset command, identifying a quantity of contents accessed since a last access command, identifying that an initialization flag (e.g., a fDeviceInit flag) has not been set, identifying that a boot logic unit number (BOOT LUN) of the memory system has been accessed and read, or any combination thereof. By preemptively closing one or more operations of a phase based on identifying a likelihood of receiving a reset command for the respective phase, the UFS device may reduce the latency associated with the UFS boot-up procedure.

Figure 1:
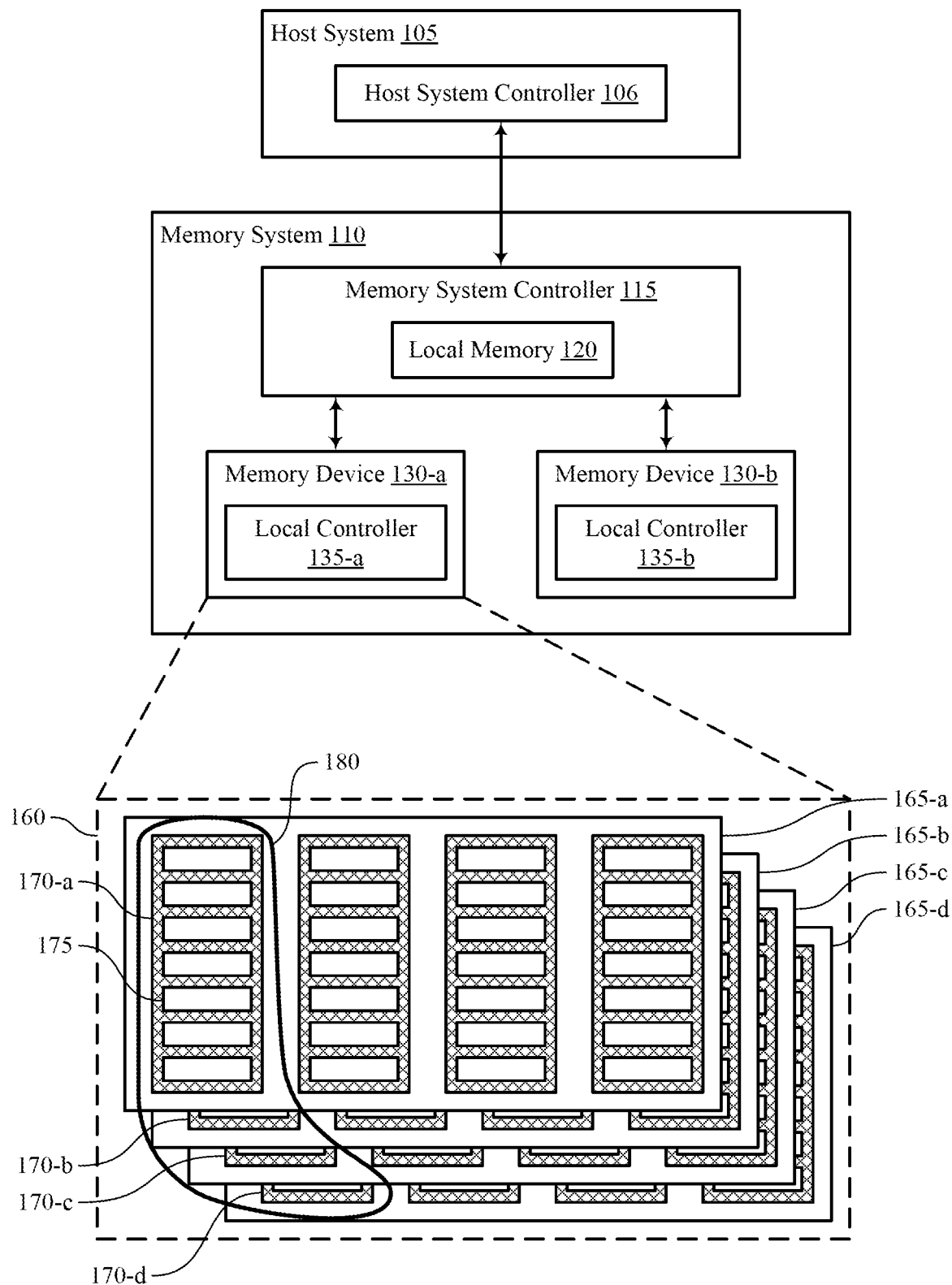
FIG. 1 illustrates an example of a system that supports hardware reset management for universal flash storage (UFS) in accordance with examples as disclosed herein.
Figure 2:
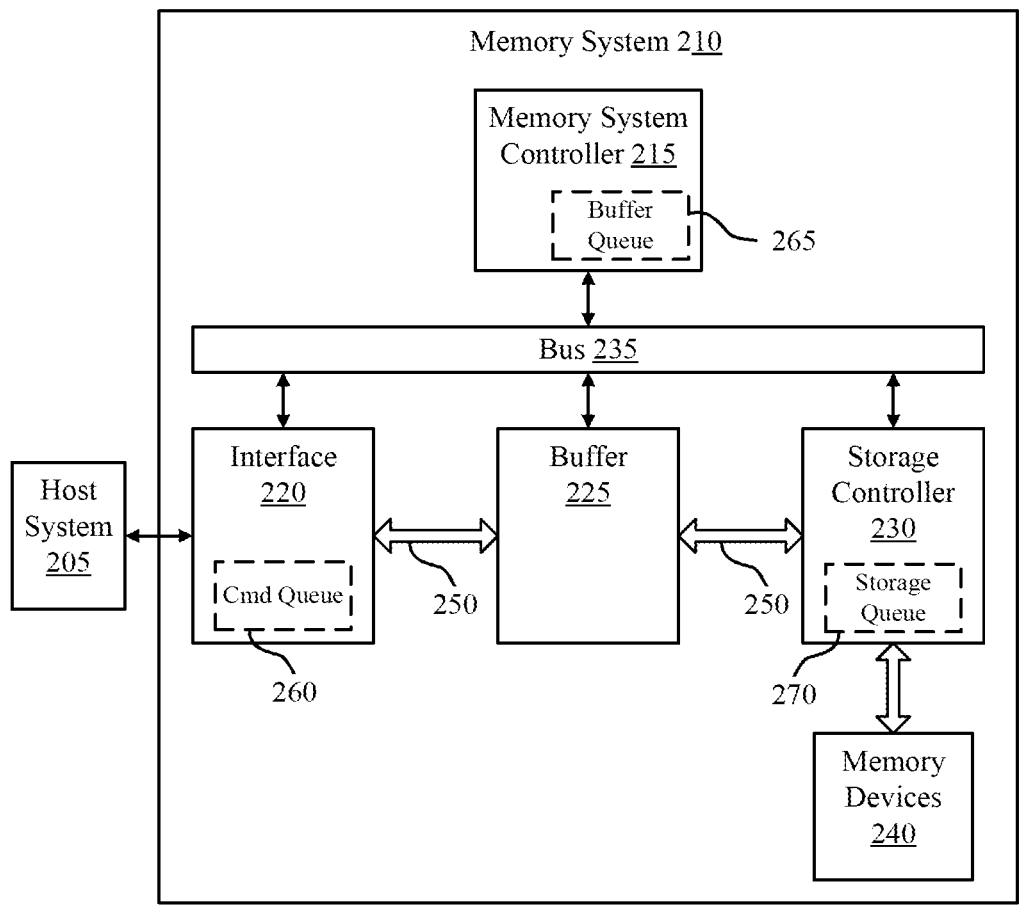
FIG. 2 illustrates an example of a system that supports hardware reset management for UFS in accordance with examples as disclosed herein.

Features of the disclosure are initially described in the context of systems, devices, and circuits with reference to FIGS. 1 and 2. Features of the disclosure are described in the context of timing diagrams and process flows with reference to FIGS. 3 and 4. These and other features of the disclosure are further illustrated by and described in the context of an apparatus diagram and flowchart that relate to hardware reset management for UFS with reference to FIGS. 5 and 6.

FIG. 1 illustrates an example of a system 100 that supports hardware reset management for UFS in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a UFS device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations-which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

The system 100 may include any quantity of non-transitory computer readable media that support hardware reset management for UFS. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

In some examples, the techniques and methods of system 100 may be implemented by and associated with a UFS device. In some examples, the UFS device may experience a delay between powering on the systems (e.g., due to the UFS device being started) and other systems of the device coming online may occur due at least in part to latency from the boot-up procedure.

Accordingly, the UFS device may apply techniques described herein that reduce the duration of the boot-up procedure. For instance, a boot-up procedure may be characterized by multiple phases (e.g., PBL phase, an XBL phase, and a kernel boot loader phase), where each phase of the boot-up procedure may be preceded by a hardware reset of one or more components of the system 100. In some examples, one or more operations associated with a next phase of the boot-up procedure may be conducted during the current phase of the boot-up procedure and before the UFS device may perform a requested reset command. As such, the UFS device may reduce a time between receiving the reset command and performing the reset operation by identifying a likelihood of at what time a reset command may be received. If the UFS device determines that the likelihood of receiving the reset command satisfies one or more conditions, a memory system 110 of the UFS device may preemptively begin to conclude operations of a given phase (e.g., the XBL phase) and preemptively perform one or more operations associated with a reset operation. By preemptively closing one or more operations of a phase based on identifying a likelihood of receiving a reset command for the respective phase, the UFS device may reduce the latency associated with the UFS boot-up procedure.

FIG. 2 illustrates an example of a system 200 that supports hardware reset management for UFS in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands, and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine if the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, e.g., by the memory system controller 215. The entries may be removed from the storage queue 270, e.g., by the storage controller 230 or memory system controller 215 upon completion of the transfer of the data.

To process a read command received from the host system 205, the memory system controller 215 may again first determine if the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, at the time the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMMC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed herein. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the described operations in conjunction with or instead of the memory system controller 215. In some cases, the memory system controller 215 may perform the functions of the storage controller 230 and the storage controller 230 may be omitted.

In some examples, the techniques and methods of system 200 may be implemented by and associated with a UFS device. In some examples, the UFS device may experience a delay between powering on the systems (e.g., due to the UFS device being started) and other systems of the device coming online may occur due at least in part to latency from the boot-up procedure.

Accordingly, the UFS device may apply techniques described herein that reduce the duration of the boot-up procedure. For instance, a boot-up procedure may be characterized by multiple phases (e.g., PBL phase, an XBL phase, and a kernel boot loader phase), where each phase of the boot-up procedure may be preceded by a hardware reset of one or more components of the system 100. In some examples, one or more operations associated with a next phase of the boot-up procedure may be conducted during the current phase of the boot-up procedure and before the UFS device may perform a requested reset command. As such, the UFS device may reduce a time between receiving the reset command and performing the reset operation by identifying a likelihood of at what time a reset command may be received. If the UFS device determines that the likelihood of receiving the reset command satisfies one or more conditions, a memory system 210 of the UFS device may preemptively begin to conclude operations of a given phase (e.g., the XBL phase) and preemptively perform one or more operations associated with a reset operation. By preemptively closing one or more operations of a phase based on identifying a likelihood of receiving a reset command for the respective phase, the UFS device may reduce the latency associated with the UFS boot-up procedure.

Figure 3:
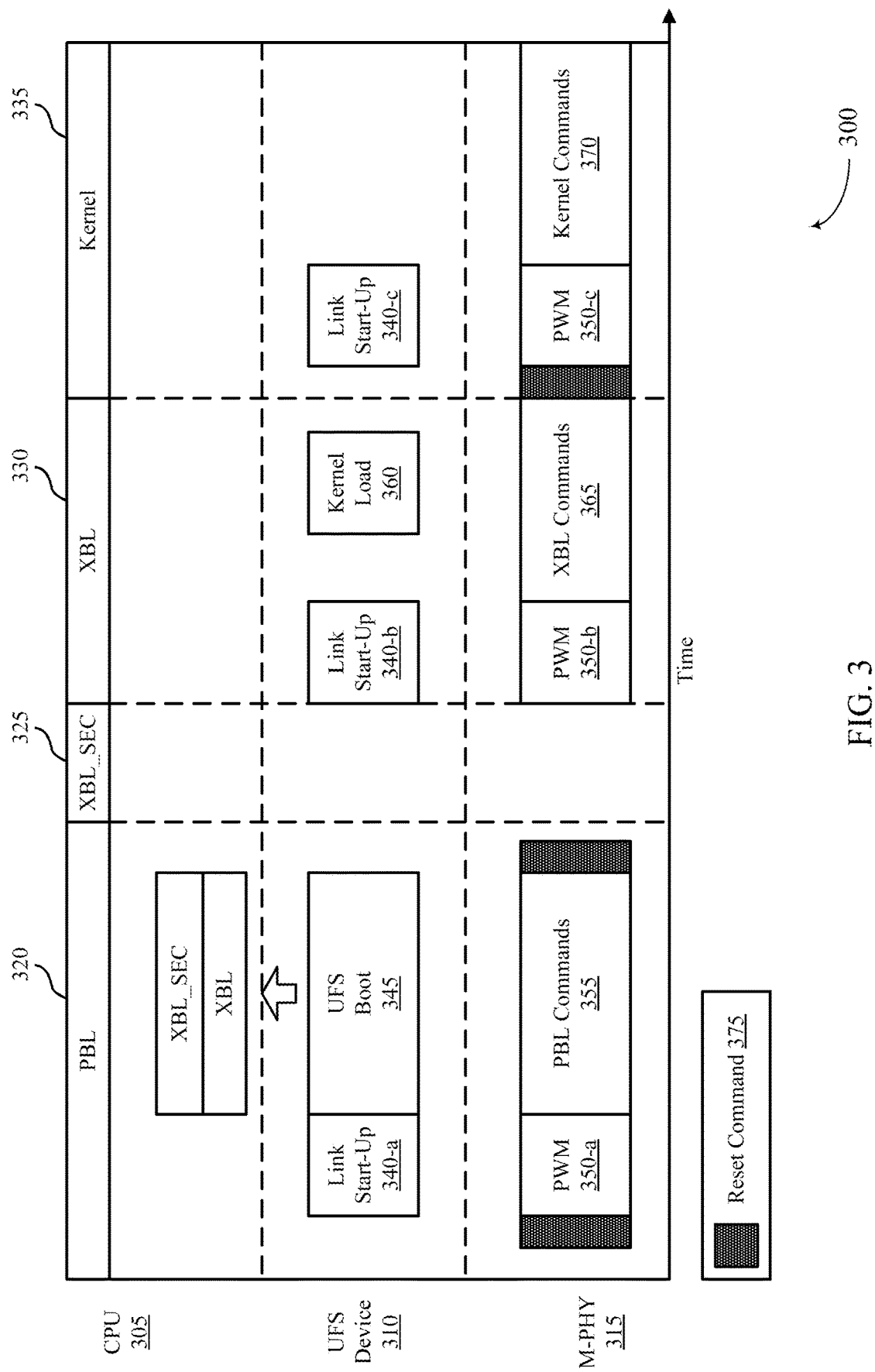
FIG. 3 illustrates an example of a timing diagram that supports hardware reset management for UFS in accordance with examples as disclosed herein.

FIG. 3 illustrates an example of a timing diagram 300 that supports hardware reset management for UFS in accordance with examples as disclosed herein. In some examples, timing diagram 300 may be implemented by one or more aspects of systems 100 and/or 200. For instance, timing diagram 300 may be implemented by a memory system 110 and host system 105 as described with reference to FIG. 1 and/or a memory system 210 and host system 205 as described with reference to FIG. 2. For instance, a UFS device 310 may be an example of a memory system, a host system, or a combination thereof. In some examples, timing diagram 300 may correspond to one or more phases of a boot-up procedure for the UFS device 310. Aspects of the timing diagram 300 may be implemented by a controller, among other components. Additionally, or alternatively, aspects of the timing diagram 300 may be implemented as instructions stored in memory (e.g., firmware stored in a memory coupled with a controller). For example, the instructions, in response to being executed by a controller (e.g., the memory system controller 115), may cause the controller to perform the operations of the timing diagram 300.

As illustrated in FIG. 3, the timing diagram 300 may display the one or more phases associated with the boot-up procedure of the UFS device 310. For example, based on identifying a power on condition (e.g., receiving a power on request from the associated host system), the UFS device 310 may initiate a PBL 320 phase of the boot-up procedure. In some examples, the UFS device 310 may receive from the host system, one or more commands to perform during the PBL 320 phase and other associated phases of the boot-up procedure via a physical (M-PHY) 315 layer. For instance, the UFS device 310 may receive via the M-PHY 315 layer, a first reset command 375 from the host system requesting for the UFS device 310 to reset one or more circuits of the memory system associated with the PBL 320 phase of the boot-up procedure. In some examples, the first reset command 375 may be an example of a power-on reset command 375 used to initiate a preliminary reset of hardware associated with the memory system upon turning on.

Based on performing the first reset command 375, the UFS device 310 may execute a link start-up 340-a to reestablish communications with the host system via the M-PHY 315 layer. In some examples, during the link start-up 340-a, the UFS device 310 and host system may communicate pulse-width modulation (PWM) signaling (e.g., PWM 350-a), which may reduce the average power associated with communications by separating the signal into discrete parts. During the PBL 320 phase, a system central processing unit (CPU) 305 of the UFS device 310 may also boot from an internal ROM of the memory system. As such, during the PBL 320 phase, the UFS device 310 may perform a UFS boot 345. In some examples of performing the UFS boot 345, the CPU 305 may initiate set-up for a secure XBL (XBL_SEC 325) phase and an XBL 330 phase. During the UFS boot 345 procedure, the UFS device 310 may also receive via the M-PHY 315 layer one or more PBL commands 355 to perform during the PBL 320 phase.

In some cases, during the XBL 330 phase (e.g., an extended primary boot loader (ePBL) phase) the system CPU 305 may load code from storage and execute UFS device 310 initialization. In some examples, performing one or more portions of the XBL 330 phase may be contingent on receiving a second reset command 375 from the host system via the M-PHY 315 layer. For instance, the second reset command 375 may be an example of an XBL hardware reset command 375 in which one or more circuits associated with the memory system are requested for reset. To perform the second reset command 375, the UFS device 310 may finalize pending operations and release resources associated with the XBL 330 phase during an idle period between reception and execution of the second reset command 375. However, the duration of the idle period may introduce latency into the UFS boot-up procedure. As such, the UFS device 310 may reduce the idle time by identifying a likelihood of receiving the second reset command 375. Based on identifying that receiving the reset command 375 is likely, the UFS device 310 may preemptively perform one or more operations associated with the second reset command 375 before receiving the second reset command 375.

In some cases, the UFS device 310 may identify the likelihood of receiving the second reset command 375 based on one or more indicators of the boot-up procedure. One example of an indicator may be the UFS device 310 identifying the power on condition received from the host system. Additionally, or alternatively, the UFS device 310 may identify the likelihood based on one or more initialization flags. For instance, the host system may set an initialization flag (e.g., the fDeviceInit flag) to an initial value (e.g., of "01h") to communicate to the UFS device 310 to complete an initialization portion of the boot-up procedure. At a duration after setting the initial value, the host system may perform a query by polling the fDeviceInit flag to check if the UFS device 310 has completed the initialization process. If the UFS device 310 has not received a query of the fDeviceInit flag after a configured amount of time, the UFS device 310 may determine that reception of the second reset command 375 is likely.

Additionally, or alternatively, the UFS device 310 may identify the likelihood based on a logical unit number associated with the boot-up procedure (e.g., the BOOT LUN) being accessed and read by the host system. For example, the UFS device 310 may configure a counter associated with the BOOT LUN and count the total amount of accessed contents of the BOOT LUN during the boot-up procedure. If the total size of the accessed contents is above a configured counter threshold, the UFS device 310 may identify that receiving the second reset command 375 may be likely. Additionally, or alternatively, the UFS device 310 may start a timer associated with the idle time between an acknowledgement flow control (AFC) traffic class 0 (TC0) event (e.g., representing the completion of a last READ_10 command in the BOOT LUN) and reception of a previous reset command 375. If the timer satisfies a timing threshold, the UFS device 310 may identify that receiving the second reset command 375 may be likely. In some examples, the UFS device 310 may configure the counter threshold and the timing threshold based on a previous boot-up procedure. For instance, the UFS device 310 may identify in a previous boot-up procedure the amount of accessed contents of the BOOT LUN at the time that the second reset command 375 is received as well as the idle time between the AFC TC0 event and receiving the first reset command 375. As such, the UFS device 310 may use this information to configure the counter threshold and the timing threshold to use as predictive measures to identify the likelihood of receiving the second reset command 375 during following boot-up procedures.

Based on identifying that receiving the second reset command 375 is likely, the memory system may preemptively prepare for receiving the second reset command 375. For example, the UFS device 310 may complete and close any pending operations and release resources related to the XBL 330 phase of the boot-up procedure. Additionally, or alternatively, the UFS device 310 may start the internal initialization procedure and take the initial steps to prepare PWM reads (e.g., the PWM 350-*b* reads) and the steps carried out during query of the fDeviceInit flag (e.g., reset the fDeviceInit flag indicating the end of the initialization process).

Based on preemptively preparing for the second reset command 375, the UFS device 310 may monitor the M-PHY 315 layer for the second reset command 375. Upon detection of the second reset command 375, the UFS device 310 may reset a controller associated with the M-PHY 315 layer which may allow for reset management of the M-PHY 315 bus (e.g., perform link start-up 340-*b*). As such, the UFS device 310 may transmit an indication of a successful reset operation to the host system via the M-PHY 315 layer.

In some examples, the UFS device 310 may perform the indication of the successful reset operation using a hardware reset pin. For instance, the UFS device may apply a voltage value to the hardware reset pint (e.g., either a high voltage value or a low voltage value) where the voltage value may indicate to the host system that the hardware reset has occurred. In some examples, the UFS device 310 may also monitor for and receive the second reset command 375 via the hardware reset pin. For instance, the host system may apply a different voltage value to the hardware reset pin, indicating to the UFS device 310 to a reset command 375.

Based on completing the second reset operation, the UFS device 310 may receive one or more XBL commands 365 that may indicate one or more operations for the UFS device 310 to perform during the XBL 330 phase of the boot-up procedure. For instance, the UFS device 310 may receive a command to prepare and preform a kernel load 360 to set-up the kernel 335 phase of the boot-up procedure. In some examples, the kernel 335 phase may include one or more sub-phases of the boot-up procedure. For instance the kernel 335 phase may include a UBOOT phase (e.g., an android boot loader phase, a unified extensible firmware interface (UEFI) phase, or TZ phase) during which the UFS device 310 may perform integrity verification steps of the memory system. Additionally, or alternatively, the kernel 335 phase may include an operating system (OS) boot phase, in which the UFS device 310 may load an associated OS (e.g., Linux, QNX, Microsoft, Android) to initialize user space in which a user may interact with the UFS device. For instance, the UFS device may be associated with a vehicle (e.g., a car, a truck, a train, a motorcycle), an aircraft (e.g., a plane, a helicopter), a boat, or a human-powered transport (e.g., a bicycle). In some examples, the vehicle may include systems that employ the use of the memory system and/or the host system. For instance, the vehicle may include a parking camera or a back-up camera that stores information at or retrieves information from the memory system. Additionally, or alternatively, the kernel 335 phase may include an application boot phase, in which the UFS device 310 initiates the user space application.

In some examples, performing one or more portions of the kernel 335 phase may be contingent on receiving a third reset command 375 from the host system via the M-PHY 315 layer. For example, the third reset command 375 may be an example of an OS hardware reset which may be performed by the UFS device 310 during high-end OS operations. In some examples, the UFS device 310 may receive the third reset command 375 via the hardware reset pin. Based on reducing the idle time for performing the second reset operation, the UFS device 310 may perform the third reset operation earlier which may reduce the total duration of the boot-up procedure.

Additionally, or alternatively, while aspects of the techniques for preemptively preparing for reception of a reset command 375 were described with reference to the XBL 330 phase, it is understood that the UFS device 310 may implement one or more of the techniques for identifying a likelihood of receiving a reset command 375 to the kernel 335 phase or any other phase of the boot-up procedure. Based on completing the third reset operation, the UFS device may perform a link start-up 340-c to reestablish connection with host system via the M-PHY 315 link. In some examples, during the link start-up 340-c, the UFS device 310 and host system may communicate PWM 350-c signaling which may reduce the average power associated with communications by separating the signal into discrete parts. During the kernel 335 phase, the UFS device 310 may also receive one or more kernel commands 370, indicating a set of operation for the UFS device 310 to perform during the kernel 335 phase of the boot-up procedure.

Figure 4:
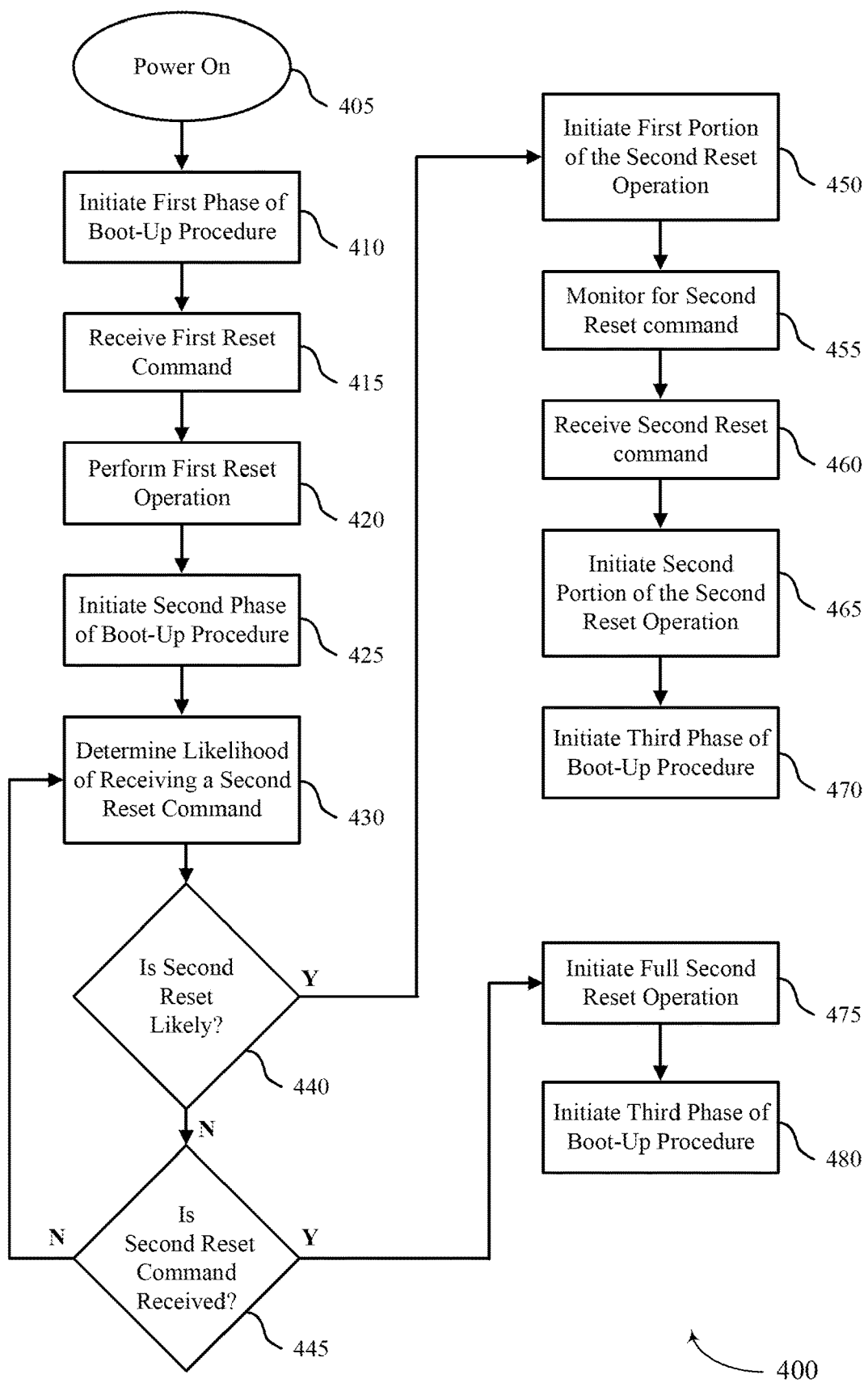
FIG. 4 illustrates an example of a process flow that supports hardware reset management for UFS in accordance with examples as disclosed herein.

FIG. 4 illustrates an example of a process flow 400 that supports hardware reset management for UFS in accordance with examples as disclosed herein. In some examples, process flow 400 may be implemented by one or more aspects of systems 100 and/or 200. For instance, process flow 400 may be implemented by a memory system 110 as described with reference to FIG. 1 and/or a memory system 210 as described with reference to FIG. 2. In some examples, process flow 400 may correspond to one or more phases of a boot-up procedure for a UFS device 310 with reference to FIG. 3. Aspects of the process flow 400 may be implemented by a controller, among other components. Additionally, or alternatively, aspects of the process flow 400 may be implemented as instructions stored in memory (e.g., firmware stored in a memory coupled with a controller). For example, the instructions, in response to being executed by a controller (e.g., the memory system controller 115), may cause the controller to perform the operations of the process flow 400.

At 405, power on for a host system of a UFS device may occur. For instance, a host system and an associated memory system may power on. Powering on may include coupling one or more components of the memory system with one or more power sources, which may occur over one or more phases of a boot-up procedure.

At 410, a first phase of a boot-up procedure may be initiated (e.g., by the memory system). In some examples, the first phase of the boot-up procedure may be an example of a PBL phase (e.g., the PBL 320 phase with reference to FIG. 3). At 415, the memory system may receive from the host system a first reset command, which may be an example of a power on reset command. At 420, the memory system may perform a first reset operation to reset one or more circuits of the memory system based on receiving the first reset command during the first phase of the boot-up procedure.

At 425, a second phase of the boot-up procedure may be initiated (e.g., by the memory system). In some examples, the second phase may be an example of an XBL phase (e.g., the XBL 330 phase phase with reference to FIG. 3).

At 430, a likelihood of receiving a second reset command associated with the second phase of the boot-up procedure (e.g., an XBL hardware reset command) may be identified (e.g., by the memory system). In some examples, the memory system may identify the likelihood based on identifying whether a duration after receiving the first reset command (e.g., duration between an AFC TC0 event and the first reset command) satisfies a first threshold and whether a quantity of contents accessed (e.g., contents associated with the BOOT LUN) after receiving the first reset command satisfies a second threshold, or both. In some examples, the memory system may configure the first threshold based on a duration of time between receiving the first reset command and receiving the second reset command that occurs during a previous boot-up procedure and may configure the second threshold based on a quantity of contents accessed between receiving the first reset command and receiving the second reset command as part of the previous boot-up procedure.

In some examples, the memory system may identify the likelihood based on identifying the boot-up procedure for the host system associated with the memory system. In some examples, the UFS device may identify the likelihood based on the host system transmitting to the memory system, a request for a state of a device initialization flag (e.g., the fDeviceInit flag), and the host system receiving from the memory system, the state of the device initialization flag, where the state indicates that the device initialization flag has not set. In some examples, the memory system may identify the likelihood based on receiving a BOOT LUN indicating that an associated LUN of the memory system has been accessed and read (e.g., a last BOOT LUN READ_10 command). In some examples, the memory system may identify the likelihood based on identifying whether a duration after receiving a read command (e.g., the last BOOT LUN READ_10 command) associated with the BOOT LUN exceeds a third threshold. In some cases, the memory system may identify the likelihood using a combination of the techniques and indicators described herein.

At 440, whether or not receiving the second reset command from the host system is likely may be determined. If the memory system determines that receiving the second reset command is not likely, then at 445, the memory system may determine whether or not the second reset command has already been received. If the memory system determines that the second reset command has not been received, the memory system mat cycle back to 430 and redetermine the likelihood of receiving the second reset command.

If at 440, the memory system determines that receiving the second rest command is likely, then at 450, a first portion of the second reset operation to reset the one or more circuits of the memory system during the second phase of the boot-up procedure may be initiated (e.g., by the memory system). In some examples, initiating the first portion of the second reset operation may include closing one or more operations of the second phase of the boot-up procedure, releasing one or more resources associated with the one or more operations of the second phase of the boot-up procedure, identifying a quantity of steps for accessing contents of a register of the host system based on closing the one or more operations and releasing the one or more resources, monitoring for the second reset command based on identifying the quantity of steps, or any combination thereof.

At 455, monitoring for the second reset command may occur (e.g., by the memory system). At 460, the memory system may receive the second reset command during the second phase of the boot-up procedure after initiating the first portion of the second reset operation. In some examples, the memory system may receive the second reset command via a hardware reset pin coupled with the memory system.

At 465, a second portion of the second reset operation to reset the one or more circuits of the memory system based on receiving the second reset command during the second phase of the boot-up procedure and initiating the first portion of the second reset operation during the second phase of the boot-up procedure may be initiated (e.g., by the memory system). In some examples, at least a subset of the circuits may include a controller configured to facilitate communications between the memory system and the host system of the UFS device (e.g., a controller associated with the M-PHY 315 layer with reference to FIG. 3). In some examples, the memory system may transmit an indication for successfully resetting the one or more circuits of the memory system based on initiating the second portion of the second reset operation.

At 470, the third phase of the boot-up procedure based on initiating the second portion of the second reset operation may be initiated (e.g., by the memory system). In some examples, the third phase may be a kernel phase (e.g., the kernel 335 phase with reference to FIG. 3).

If at 445 the memory system determines that the second reset command has been received, then at 475, a full second reset operation may be initiated (e.g., by the memory system). In some examples, the full second reset operation may be a combination of performing the first portion of the second reset operation at 450 and performing the second portion of the second reset operation at 465.

At 480, the third phased of the boot-up procedure based on initiating the full second reset operation may be initiated (e.g., by the memory system).

Figure 5:
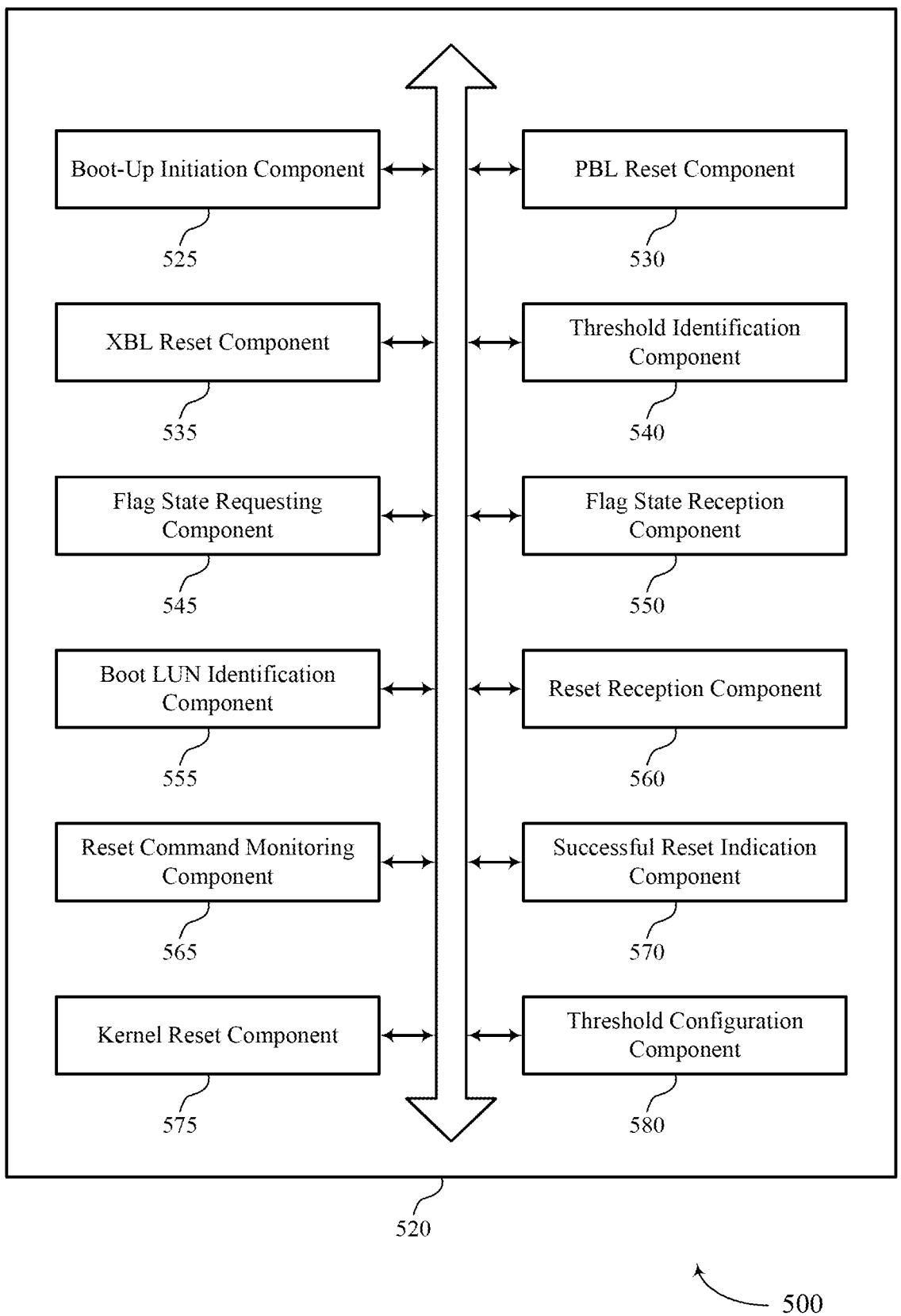
FIG. 5 shows a block diagram of a memory system that supports hardware reset management for UFS in accordance with examples as disclosed herein.

FIG. 5 shows a block diagram 500 of a memory system 520 that supports hardware reset management for UFS in accordance with examples as disclosed herein. The memory system 520 may be an example of aspects of a memory system as described with reference to FIGS. 1 through 4. The memory system 520, or various components thereof, may be an example of means for performing various aspects of hardware reset management for UFS as described herein. For example, the memory system 520 may include a boot-up initiation component 525, a PBL reset component 530, an XBL reset component 535, a threshold identification component 540, a flag state requesting component 545, a flag state reception component 550, a boot LUN identification component 555, a reset reception component 560, a reset command monitoring component 565, a successful reset indication component 570, a kernel reset component 575, a threshold configuration component 580, or any combination thereof. Each of these components may communicate, directly or indirectly, with one another (e.g., via one or more buses).

The boot-up initiation component 525 may be configured as or otherwise support a means for initiating a boot-up procedure for a host system associated with a memory system, the boot-up procedure including a first phase, a second phase, and a third phase. The PBL reset component 530 may be configured as or otherwise support a means for performing a first reset operation to reset one or more circuits of the memory system based on receiving a first reset command during the first phase of the boot-up procedure. The XBL reset component 535 may be configured as or otherwise support a means for initiating a portion of a second reset operation to reset the one or more circuits of the memory system during the second phase of the boot-up procedure based on a likelihood that a second reset command is to be received after performing the first reset operation. In some examples, the XBL reset component 535 may be configured as or otherwise support a means for receiving the second reset command during the second phase of the boot-up procedure after initiating the portion of the second reset operation.

In some examples, to support initiating the portion of the second reset operation, the XBL reset component 535 may be configured as or otherwise support a means for closing one or more operations of the second phase of the boot-up procedure. In some examples, to support initiating the portion of the second reset operation, the XBL reset component 535 may be configured as or otherwise support a means for releasing one or more resources associated with the one or more operations of the second phase of the boot-up procedure.

In some examples, the XBL reset component 535 may be configured as or otherwise support a means for identifying a quantity of steps for accessing contents of a register of the host system based on closing the one or more operations and releasing the one or more resources. In some examples, the reset command monitoring component 565 may be configured as or otherwise support a means for monitoring for the second reset command based on identifying the quantity of steps.

In some examples, the XBL reset component 535 may be configured as or otherwise support a means for initiating a second portion of the second reset operation to reset the one or more circuits of the memory system based on receiving the second reset command during the second phase of the boot-up procedure and initiating the portion of the second reset operation during the second phase of the boot-up procedure.

In some examples, the successful reset indication component 570 may be configured as or otherwise support a means for transmitting an indication for successfully resetting the one or more circuits of the memory system based on initiating the second portion of the second reset operation.

In some examples, the kernel reset component 575 may be configured as or otherwise support a means for initiating the third phase of the boot-up procedure based on initiating the second portion of the second reset operation.

In some examples, the threshold identification component 540 may be configured as or otherwise support a means for identifying whether a duration after receiving the first reset command satisfies a first threshold and whether a quantity of contents accessed after receiving the first reset command satisfies a second threshold, or both, where the likelihood that the second reset command is to be received is based on the identifying.

In some examples, the threshold configuration component 580 may be configured as or otherwise support a means for configuring the first threshold based on a duration of time between receiving the first reset command and receiving the second reset command that occurs during a second boot-up procedure, where the second boot-up procedure occurs before the boot-up procedure. In some examples, the threshold configuration component 580 may be configured as or otherwise support a means for configuring the second threshold based on a quantity of contents accessed between receiving the first reset command and receiving the second reset command as part of the second boot-up procedure.

In some examples, the boot-up initiation component 525 may be configured as or otherwise support a means for identifying the boot-up procedure for the host system associated with the memory system, where the likelihood that the second reset command is to be received is based on the identifying.

In some examples, the flag state requesting component 545 may be configured as or otherwise support a means for transmitting, to the memory system, a request for a state of a device initialization flag. In some examples, the flag state reception component 550 may be configured as or otherwise support a means for receiving, from the memory system, the state of the device initialization flag, where the state indicates that the device initialization flag has not set, where the likelihood that the second reset command is to be received is based on the receiving.

In some examples, the boot LUN identification component 555 may be configured as or otherwise support a means for receiving a boot logical unit number identification indicating that an associated boot logic unit number of the memory system has been accessed and read, where the likelihood that the second reset command is to be received is based on the receiving.

In some examples, the threshold identification component 540 may be configured as or otherwise support a means for identifying whether a duration after receiving a read command associated with the boot unit logic number satisfies a third threshold.

In some examples, to support receiving the second reset command, the reset reception component 560 may be configured as or otherwise support a means for receiving the second reset command via a hardware reset pin coupled with the memory system.

In some examples, at least a subset of circuits of the one or more circuits of the memory system include a controller configured to facilitate communications between the memory system and the host system of a UFS device.

In some examples, the first phase includes a UFS boot phase, the second phase includes kernel loading boot phase, and the third phase includes a kernel start boot phase.

Figure 6:
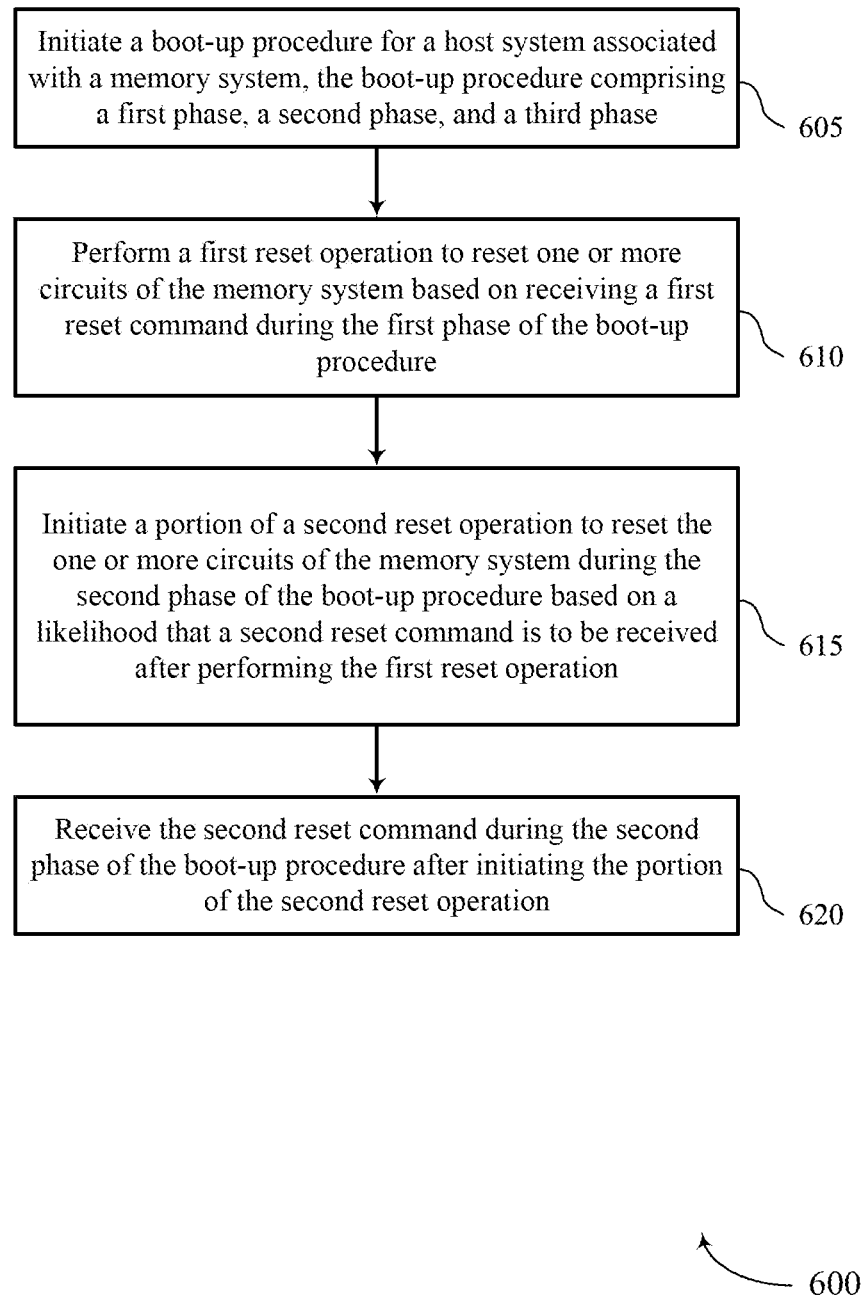
FIG. 6 shows a flowchart illustrating a method or methods that support hardware reset management for UFS in accordance with examples as disclosed herein.

FIG. 6 shows a flowchart illustrating a method 600 that supports hardware reset management for UFS in accordance with examples as disclosed herein. The operations of method 600 may be implemented by a memory system or its components as described herein. For example, the operations of method 600 may be performed by a memory system as described with reference to FIGS. 1 through 5. In some examples, a memory system may execute a set of instructions to control the functional elements of the device to perform the described functions. Additionally, or alternatively, the memory system may perform aspects of the described functions using special-purpose hardware.

At 605, the method may include initiating a boot-up procedure for a host system associated with a memory system, the boot-up procedure including a first phase, a second phase, and a third phase. The operations of 605 may be performed in accordance with examples as disclosed herein. In some examples, aspects of the operations of 605 may be performed by a boot-up initiation component 525 as described with reference to FIG. 5.

At 610, the method may include performing a first reset operation to reset one or more circuits of the memory system based on receiving a first reset command during the first phase of the boot-up procedure. The operations of 610 may be performed in accordance with examples as disclosed herein. In some examples, aspects of the operations of 610 may be performed by a PBL reset component 530 as described with reference to FIG. 5.

At 615, the method may include initiating a portion of a second reset operation to reset the one or more circuits of the memory system during the second phase of the boot-up procedure based on a likelihood that a second reset command is to be received after performing the first reset operation. The operations of 615 may be performed in accordance with examples as disclosed herein. In some examples, aspects of the operations of 615 may be performed by an XBL reset component 535 as described with reference to FIG. 5.

At 620, the method may include receiving the second reset command during the second phase of the boot-up procedure after initiating the portion of the second reset operation. The operations of 620 may be performed in accordance with examples as disclosed herein. In some examples, aspects of the operations of 620 may be performed by an XBL reset component 535 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for initiating a boot-up procedure for a host system associated with a memory system, the boot-up procedure including a first phase, a second phase, and a third phase; performing a first reset operation to reset one or more circuits of the memory system based on receiving a first reset command during the first phase of the boot-up procedure; initiating a portion of a second reset operation to reset the one or more circuits of the memory system during the second phase of the boot-up procedure based on a likelihood that a second reset command is to be received after performing the first reset operation; and receiving the second reset command during the second phase of the boot-up procedure after initiating the portion of the second reset operation.

Aspect 2: The method, apparatus, or non-transitory computer-readable medium of aspect 1 where initiating the portion of the second reset operation, further includes operations, features, circuitry, logic, means, or instructions, or any combination thereof for closing one or more operations of the second phase of the boot-up procedure and releasing one or more resources associated with the one or more operations of the second phase of the boot-up procedure.

Aspect 3: The method, apparatus, or non-transitory computer-readable medium of aspect 2, further including operations, features, circuitry, logic, means, or instructions, or any combination thereof for identifying a quantity of steps for accessing contents of a register of the host system based on closing the one or more operations and releasing the one or more resources and monitoring for the second reset command based on identifying the quantity of steps.

Aspect 4: The method, apparatus, or non-transitory computer-readable medium of any of aspects 1 through 3, further including operations, features, circuitry, logic, means, or instructions, or any combination thereof for initiating a second portion of the second reset operation to reset the one or more circuits of the memory system based on receiving the second reset command during the second phase of the boot-up procedure and initiating the portion of the second reset operation during the second phase of the boot-up procedure.

Aspect 5: The method, apparatus, or non-transitory computer-readable medium of aspect 4, further including operations, features, circuitry, logic, means, or instructions, or any combination thereof for transmitting an indication for successfully resetting the one or more circuits of the memory system based on initiating the second portion of the second reset operation.

Aspect 6: The method, apparatus, or non-transitory computer-readable medium of any of aspects 4 through 5, further including operations, features, circuitry, logic, means, or instructions, or any combination thereof for initiating the third phase of the boot-up procedure based on initiating the second portion of the second reset operation.

Aspect 7: The method, apparatus, or non-transitory computer-readable medium of any of aspects 1 through 6, further including operations, features, circuitry, logic, means, or instructions, or any combination thereof for identifying whether a duration after receiving the first reset command satisfies a first threshold and whether a quantity of contents accessed after receiving the first reset command satisfies a second threshold, or both, where the likelihood that the second reset command is to be received is based on the identifying.

Aspect 8: The method, apparatus, or non-transitory computer-readable medium of aspect 7, further including operations, features, circuitry, logic, means, or instructions, or any combination thereof for configuring the first threshold based on a duration of time between receiving the first reset command and receiving the second reset command that occurs during a second boot-up procedure, where the second boot-up procedure occurs before the boot-up procedure and configuring the second threshold based on a quantity of contents accessed between receiving the first reset command and receiving the second reset command as part of the second boot-up procedure.

Aspect 9: The method, apparatus, or non-transitory computer-readable medium of any of aspects 1 through 8, further including operations, features, circuitry, logic, means, or instructions, or any combination thereof for identifying the boot-up procedure for the host system associated with the memory system, where the likelihood that the second reset command is to be received is based on the identifying.

Aspect 10: The method, apparatus, or non-transitory computer-readable medium of any of aspects 1 through 9, further including operations, features, circuitry, logic, means, or instructions, or any combination thereof for transmitting, to the memory system, a request for a state of a device initialization flag and receiving, from the memory system, the state of the device initialization flag, where the state indicates that the device initialization flag has not set, where the likelihood that the second reset command is to be received is based on the receiving.

Aspect 11: The method, apparatus, or non-transitory computer-readable medium of any of aspects 1 through 10, further including operations, features, circuitry, logic, means, or instructions, or any combination thereof for receiving a boot logical unit number identification indicating that an associated boot logic unit number of the memory system has been accessed and read, where the likelihood that the second reset command is to be received is based on the receiving.

Aspect 12: The method, apparatus, or non-transitory computer-readable medium of aspect 11, further including operations, features, circuitry, logic, means, or instructions, or any combination thereof for identifying whether a duration after receiving a read command associated with the boot unit logic number satisfies a third threshold.

Aspect 13: The method, apparatus, or non-transitory computer-readable medium of any of aspects 1 through 12 where receiving the second reset command, further includes operations, features, circuitry, logic, means, or instructions, or any combination thereof for receiving the second reset command via a hardware reset pin coupled with the memory system.

Aspect 14: The method, apparatus, or non-transitory computer-readable medium of any of aspects 1 through 13 where at least a subset of circuits of the one or more circuits of the memory system include a controller configured to facilitate communications between the memory system and the host system of a UFS device.

Aspect 15: The method, apparatus, or non-transitory computer-readable medium of any of aspects 1 through 14 where the first phase includes a UFS boot phase, the second phase includes kernel loading boot phase, and the third phase includes a kernel start boot phase.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed, and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed, and second condition or action may occur directly as a result of the previous condition or action occurring independent of whether other conditions or actions occur. In some examples, a first condition or action may be performed, and second condition or action may occur directly as a result of the previous condition or action occurring, such that no other intermediate conditions or actions occur between the earlier condition or action and the second condition or action, or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
  processing circuitry associated with one or more memory devices and configured to cause the memory system to:
    initiate a boot-up procedure associated with the memory system;
    perform a first reset operation to reset one or more circuits of the memory system in response to receiving a first reset command during the boot-up procedure;
    determine whether to initiate a portion of a second reset operation in accordance with a likelihood that a second reset command is to be received;
    close one or more operations of the boot-up procedure in response to determining to initiate the portion of the second reset operation;
    release one or more resources associated with the one or more operations of the boot-up procedure in response to determining to initiate the portion of the second reset operation; and
    receive the second reset command during the boot-up procedure after initiating the portion of the second reset operation.

2. The memory system of claim 1, wherein the processing circuitry is further configured to cause the memory system to:
  identify a quantity of steps for accessing contents of a register in response to closing the one or more operations and releasing the one or more resources; and
  monitor for the second reset command in response to identifying the quantity of steps.

3. The memory system of claim 1, wherein the processing circuitry is further configured to cause the memory system to:
  initiate a second portion of the second reset operation to reset the one or more circuits of the memory system in response to receiving the second reset command during the boot-up procedure and initiating the portion of the second reset operation during the boot-up procedure.

4. The memory system of claim 3, wherein the processing circuitry is further configured to cause the memory system to:
  transmit an indication for successfully resetting the one or more circuits of the memory system in response to initiating the second portion of the second reset operation.

5. The memory system of claim 1, wherein the processing circuitry is further configured to cause the memory system to:
  identify whether a duration after receiving the first reset command satisfies a first threshold and whether a quantity of contents accessed after receiving the first reset command satisfies a second threshold, or both, wherein the likelihood that the second reset command is to be received is in response to the identifying.

6. The memory system of claim 5, wherein the processing circuitry is further configured to cause the memory system to:
  configure the first threshold in accordance with a duration of time between receiving the first reset command and receiving the second reset command that occurs during a second boot-up procedure, wherein the second boot-up procedure occurs before the boot-up procedure; and
  configure the second threshold in accordance with the quantity of contents accessed between receiving the first reset command and receiving the second reset command as part of the second boot-up procedure.

7. The memory system of claim 1, wherein the processing circuitry is further configured to cause the memory system to:

identify the boot-up procedure associated with the memory system, wherein the likelihood that the second reset command is to be received is in response to the identifying.

8. The memory system of claim 1, wherein the processing circuitry is further configured to cause the memory system to:
transmit, to the memory system, a request for a state of a device initialization flag; and
receive, from the memory system, the state of the device initialization flag, wherein the state indicates that the device initialization flag has not set, wherein the likelihood that the second reset command is to be received is in response to the receiving.

9. The memory system of claim 1, wherein the processing circuitry is further configured to cause the memory system to:
receive a boot logical unit number identification indicating that an associated boot logic unit number of the memory system has been accessed and read, wherein the likelihood that the second reset command is to be received is in response to the receiving.

10. The memory system of claim 9, wherein the processing circuitry is further configured to cause the memory system to:
identify whether a duration after receiving a read command associated with the boot logic unit number satisfies a third threshold.

11. The memory system of claim 1, wherein to receive the second reset command, the processing circuitry is further configured to cause the memory system to:
receive the second reset command via a hardware reset pin coupled with the memory system.

12. The memory system of claim 1, wherein at least a subset of circuits of the one or more circuits of the memory system are configured to facilitate communications between the memory system and a host system.

13. The memory system of claim 1, wherein the boot-up procedure comprises a UFS boot phase, a kernel loading boot phase, and a kernel start boot phase.

14. A non-transitory computer-readable medium storing code comprising instructions which, when executed by one or more processors of a memory system, cause the memory system to:
initiate a boot-up procedure associated with the memory system;
perform a first reset operation to reset one or more circuits of the memory system in response to receiving a first reset command during the boot-up procedure;
determine whether to initiate a portion of a second reset operation in accordance with a likelihood that a second reset command is to be received;
close one or more operations of the boot-up procedure in response to determining to initiate the portion of the second reset operation;
release one or more resources associated with the one or more operations of the boot-up procedure in response to determining to initiate the portion of the second reset operation; and
receive the second reset command during the boot-up procedure after initiating the portion of the second reset operation.

15. The non-transitory computer-readable medium of claim 14, wherein the instructions, when executed by the one or more processors of the memory system, further cause the memory system to:
identify a quantity of steps for accessing contents of a register in response to closing the one or more operations and releasing the one or more resources; and
monitor for the second reset command in response to identifying the quantity of steps.

16. The non-transitory computer-readable medium of claim 15, wherein the instructions, when executed by the one or more processors of the memory system, further cause the memory system to:
initiate a second portion of the second reset operation to reset the one or more circuits of the memory system in response to receiving the second reset command during the boot-up procedure and initiating the portion of the second reset operation during the boot-up procedure.

17. The non-transitory computer-readable medium of claim 16, wherein the instructions, when executed by the one or more processors of the memory system, further cause the memory system to:
transmit an indication for successfully resetting the one or more circuits of the memory system in response to initiating the second portion of the second reset operation.

18. The non-transitory computer-readable medium of claim 14, wherein the instructions, when executed by the one or more processors of the memory system, further cause the memory system to:
identify whether a duration after receiving the first reset command satisfies a first threshold and whether a quantity of contents accessed after receiving the first reset command satisfies a second threshold, or both, wherein the likelihood that the second reset command is to be received is in response to the identifying.

19. A method, of a memory system, comprising:
initiating a boot-up procedure associated with the memory system;
performing a first reset operation to reset one or more circuits of the memory system in response to receiving a first reset command during the boot-up procedure;
determining whether to initiate a portion of a second reset operation in accordance with a likelihood that a second reset command is to be;
closing one or more operations of the boot-up procedure in response to determining to initiate the portion of the second reset operation;
releasing one or more resources associated with the one or more operations of the boot-up procedure in response to determining to initiate the portion of the second reset operation; and
receiving the second reset command during the boot-up procedure after initiating the portion of the second reset operation.

20. The method of claim 19, further comprising:
identifying a quantity of steps for accessing contents of a register in response to closing the one or more operations and releasing the one or more resources; and
monitoring for the second reset command in response to identifying the quantity of steps.

* * * * *